June 6, 1944.  W. RODDER ET AL  2,350,975
CUT-OFF APPARATUS
Filed March 28, 1941  8 Sheets—Sheet 1
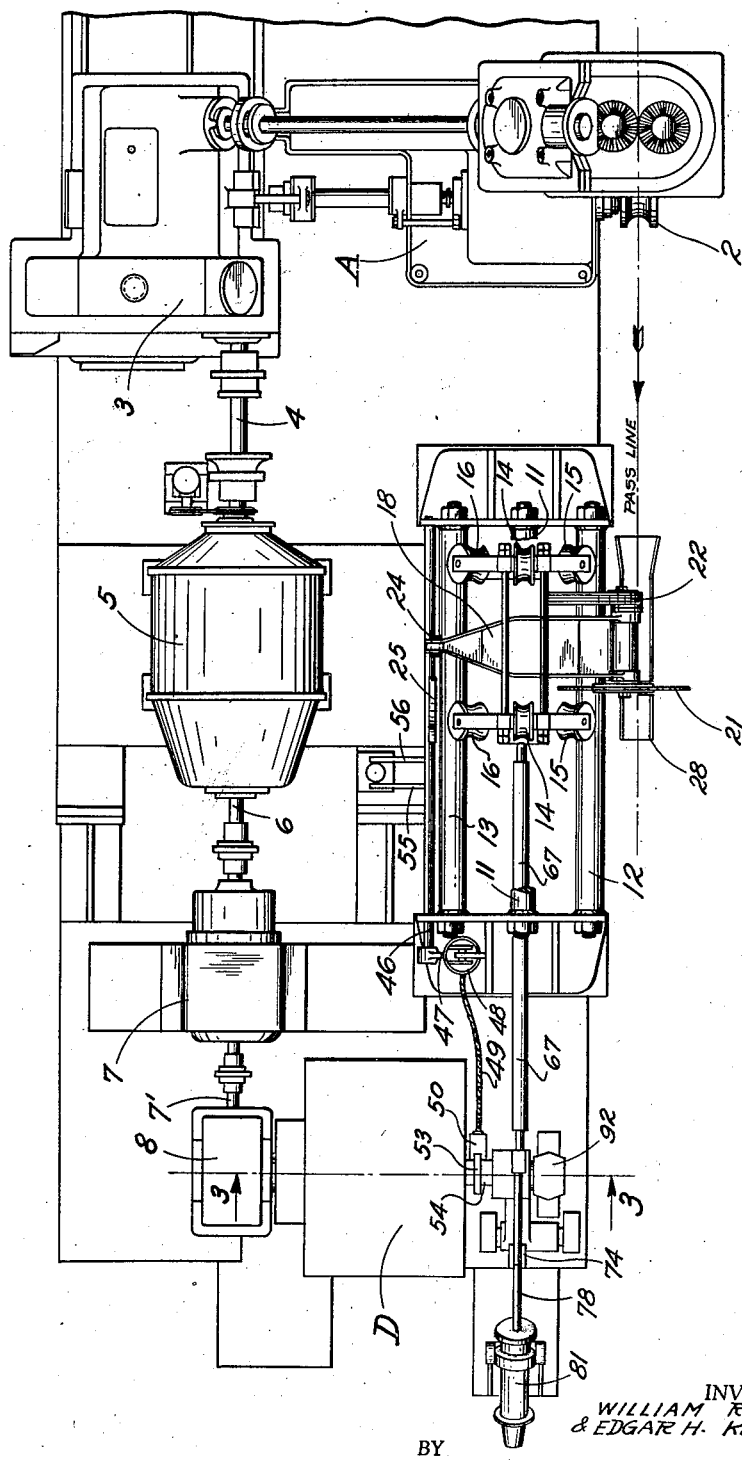
INVENTORS
WILLIAM RODDER
& EDGAR H. KENDALL
BY
Richey & Watts
ATTORNEYS

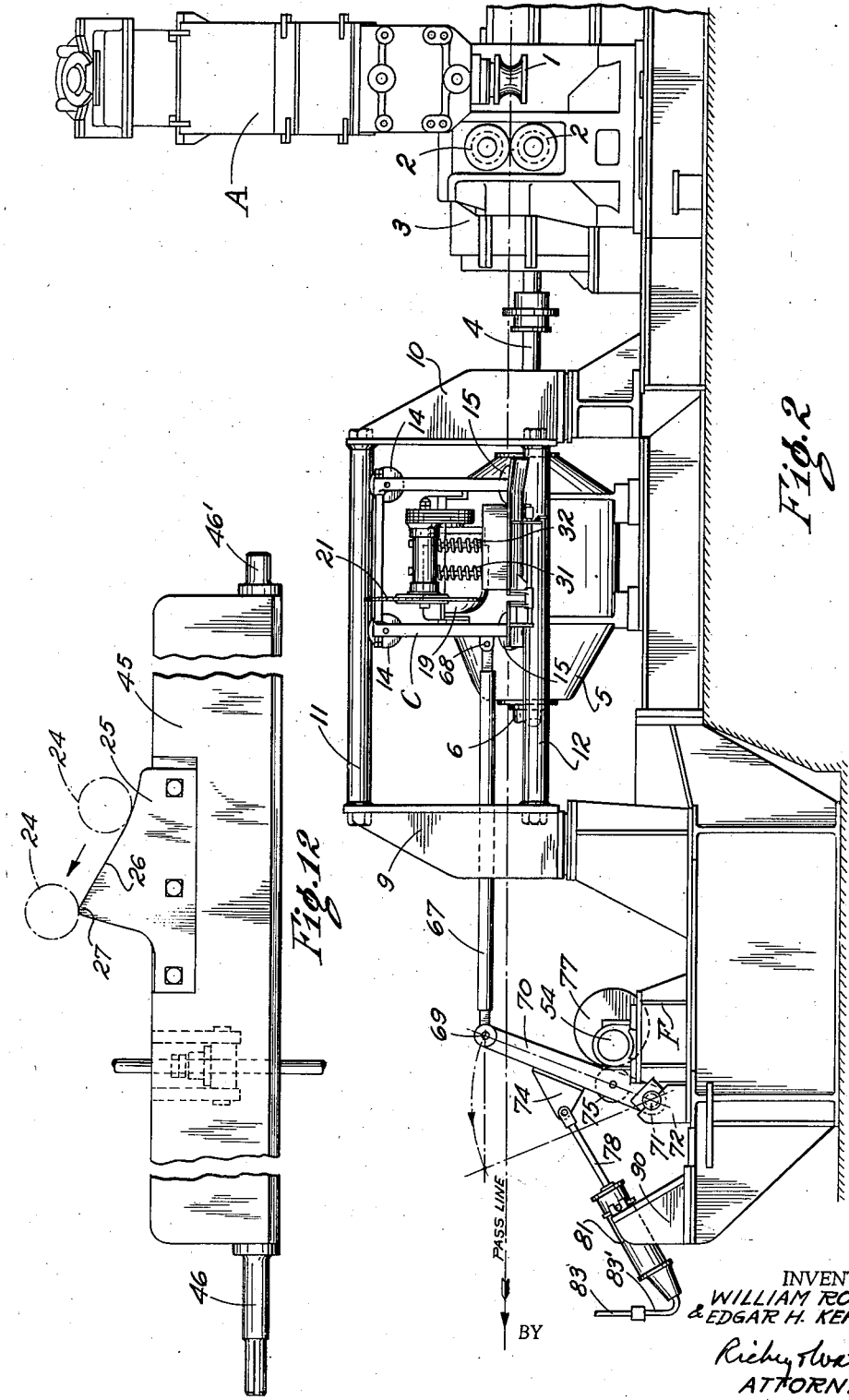

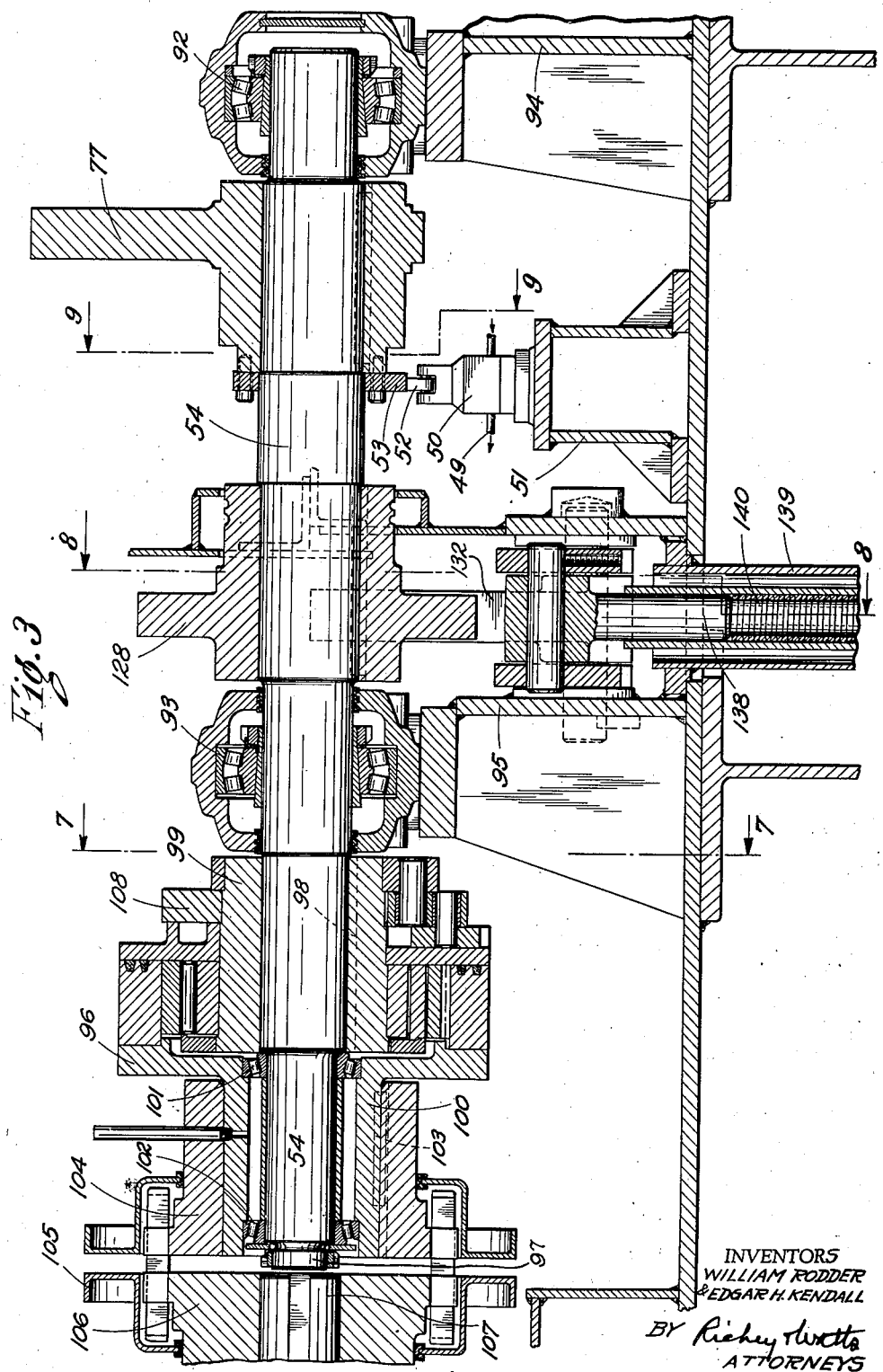

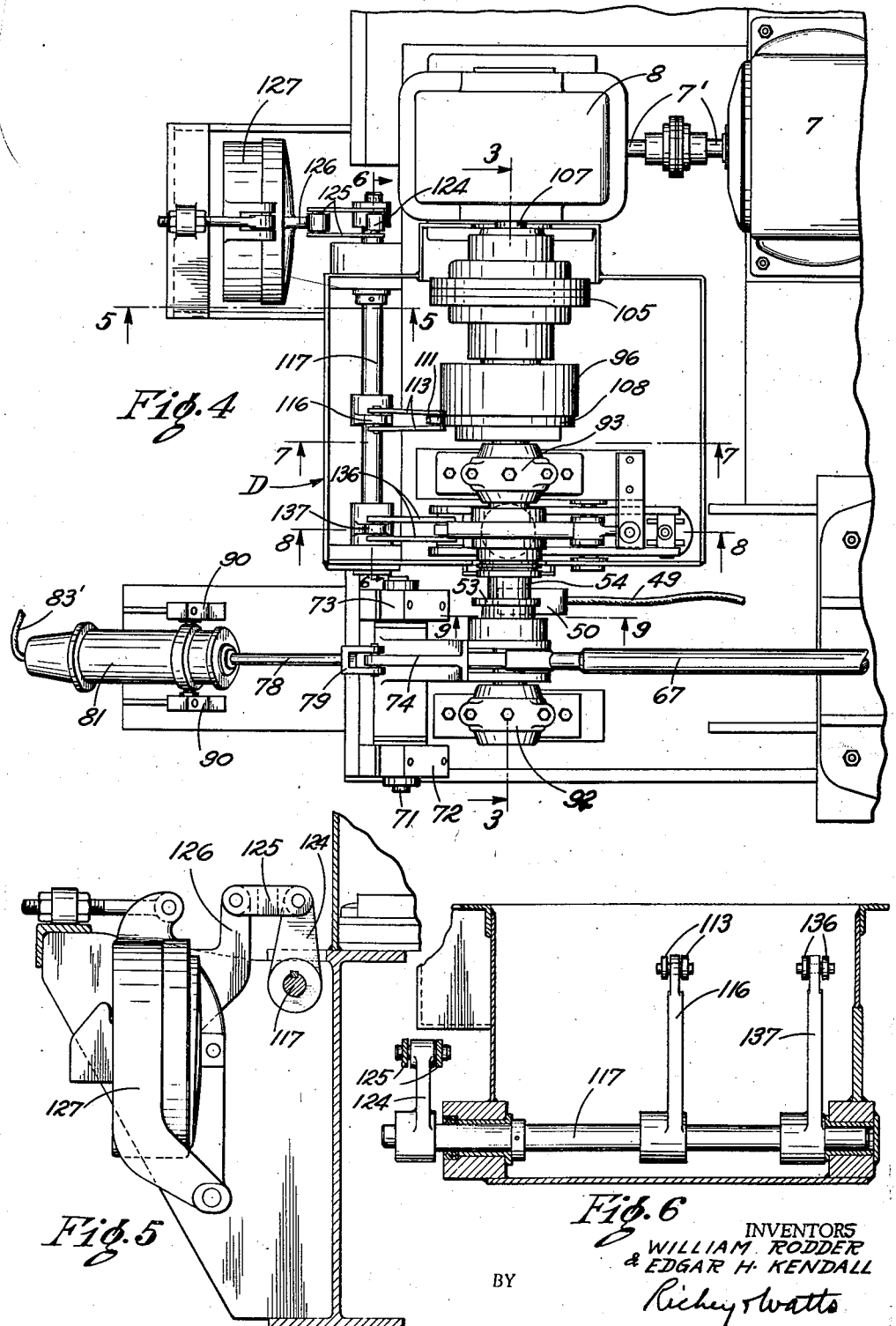

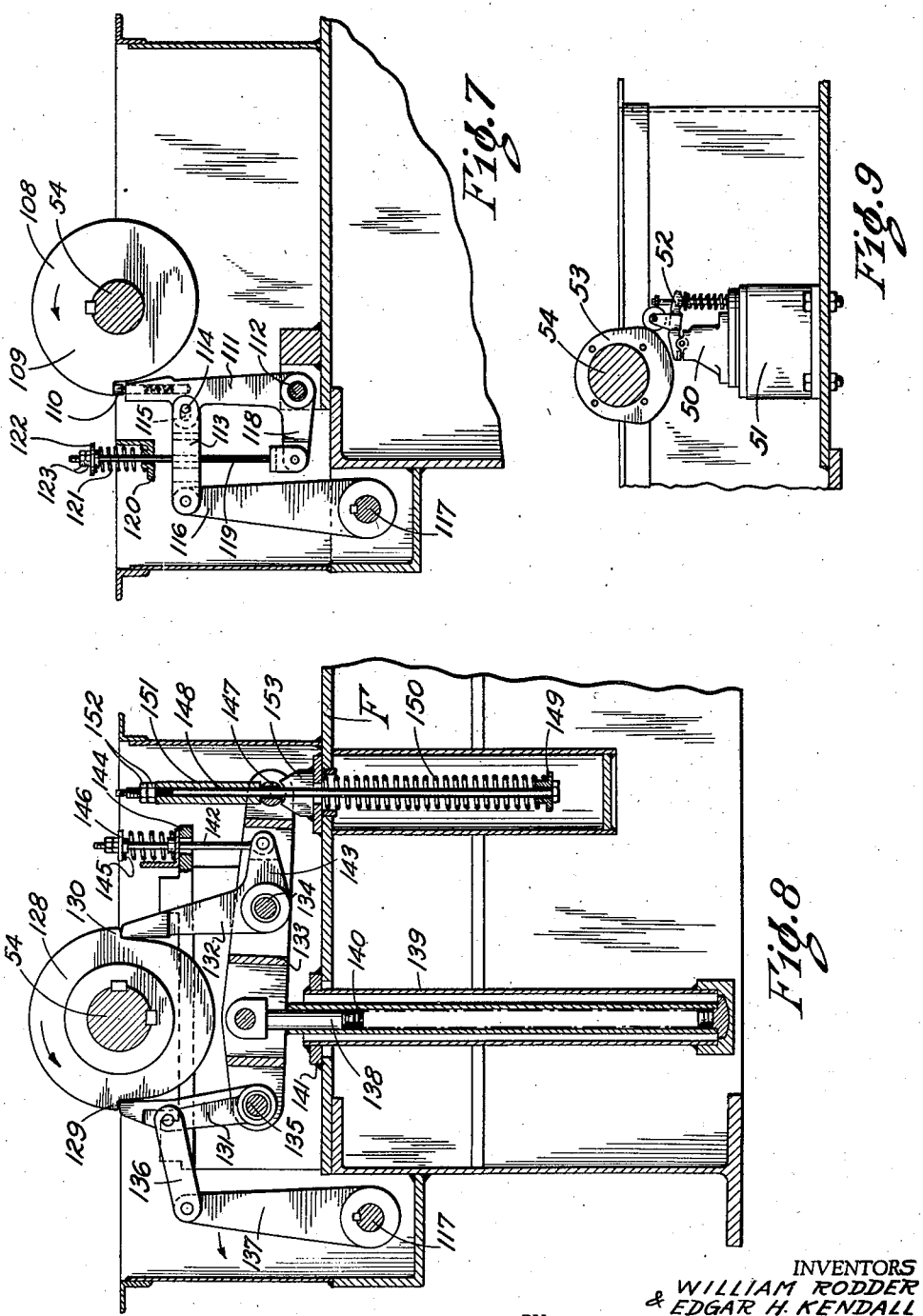

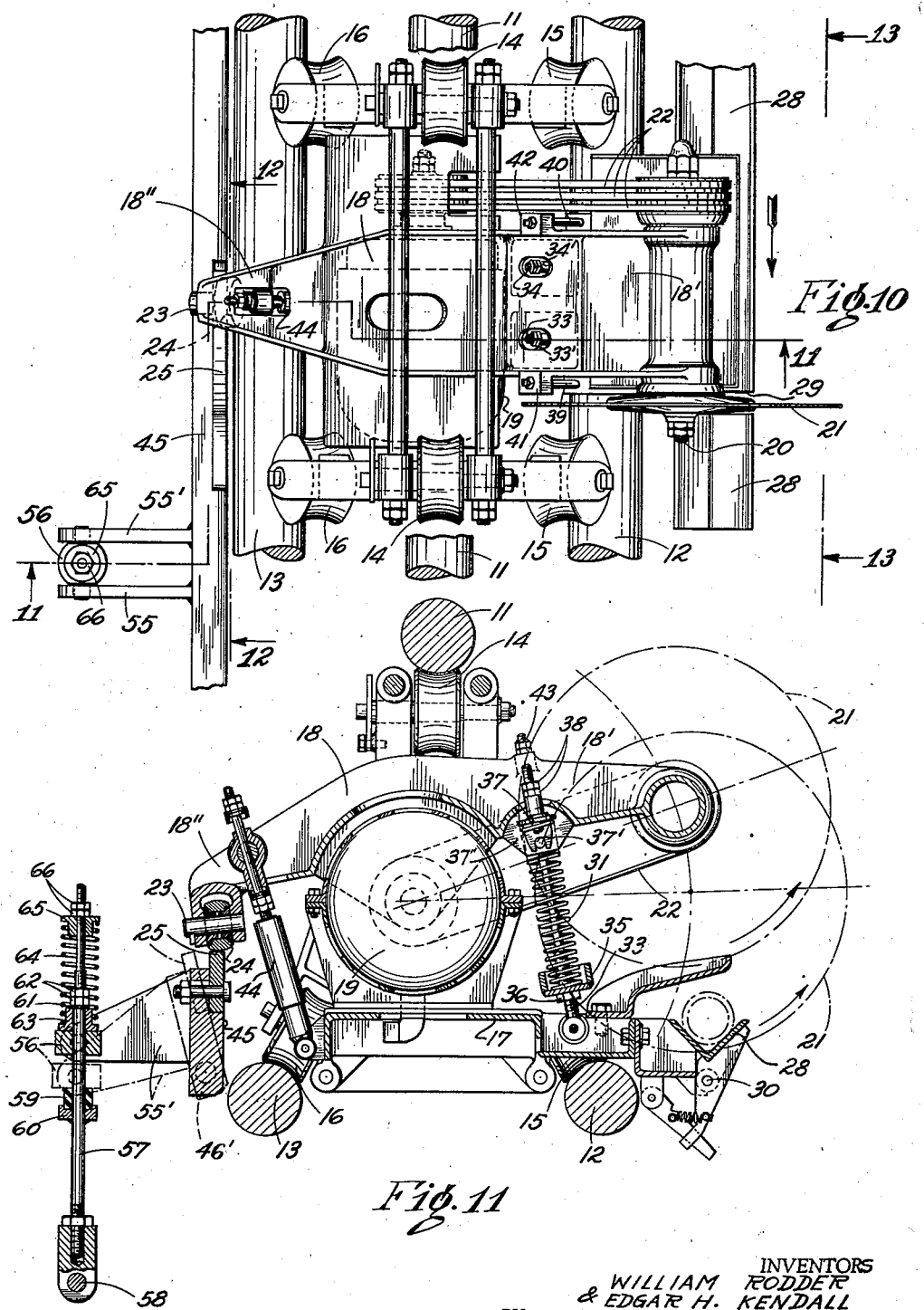

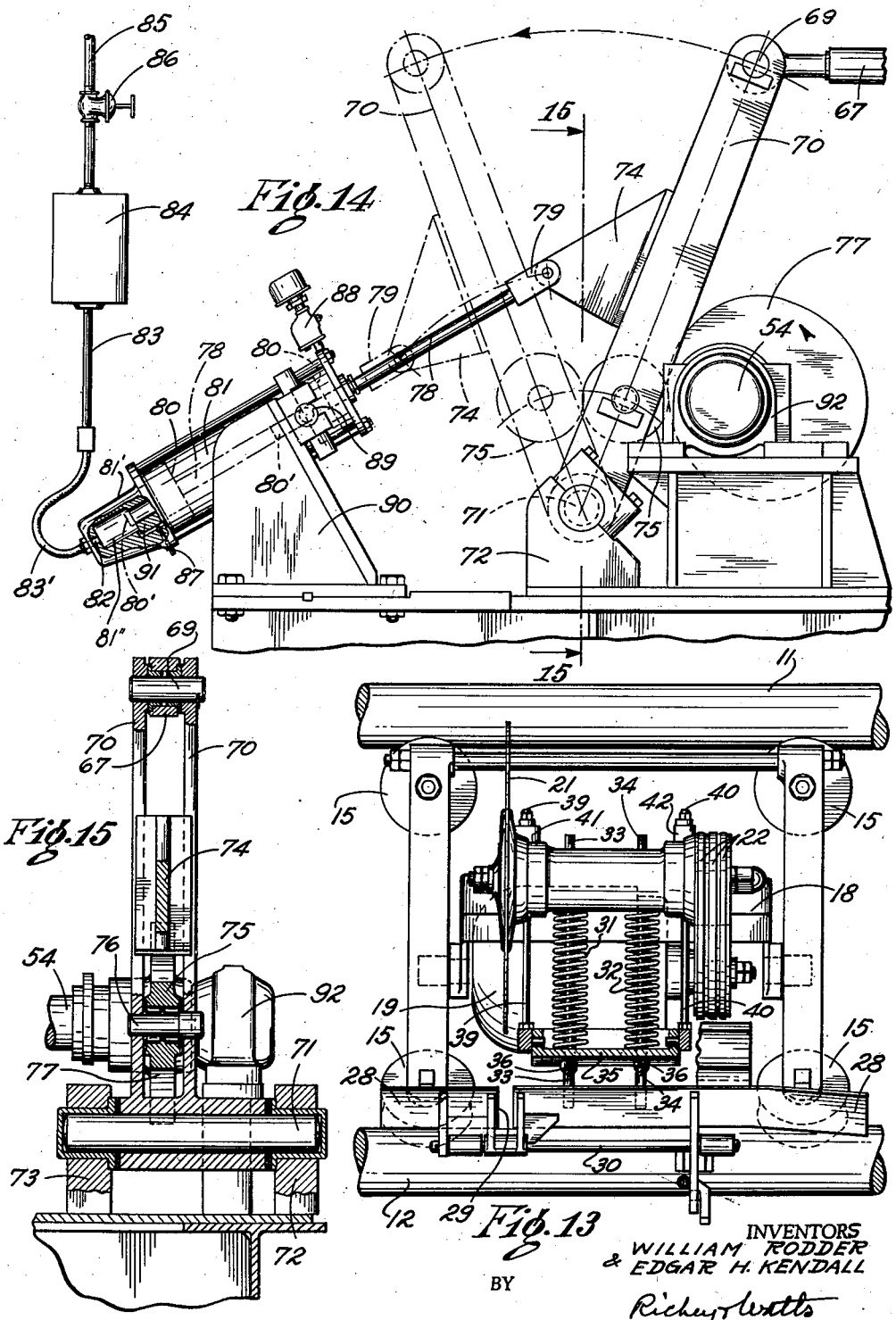

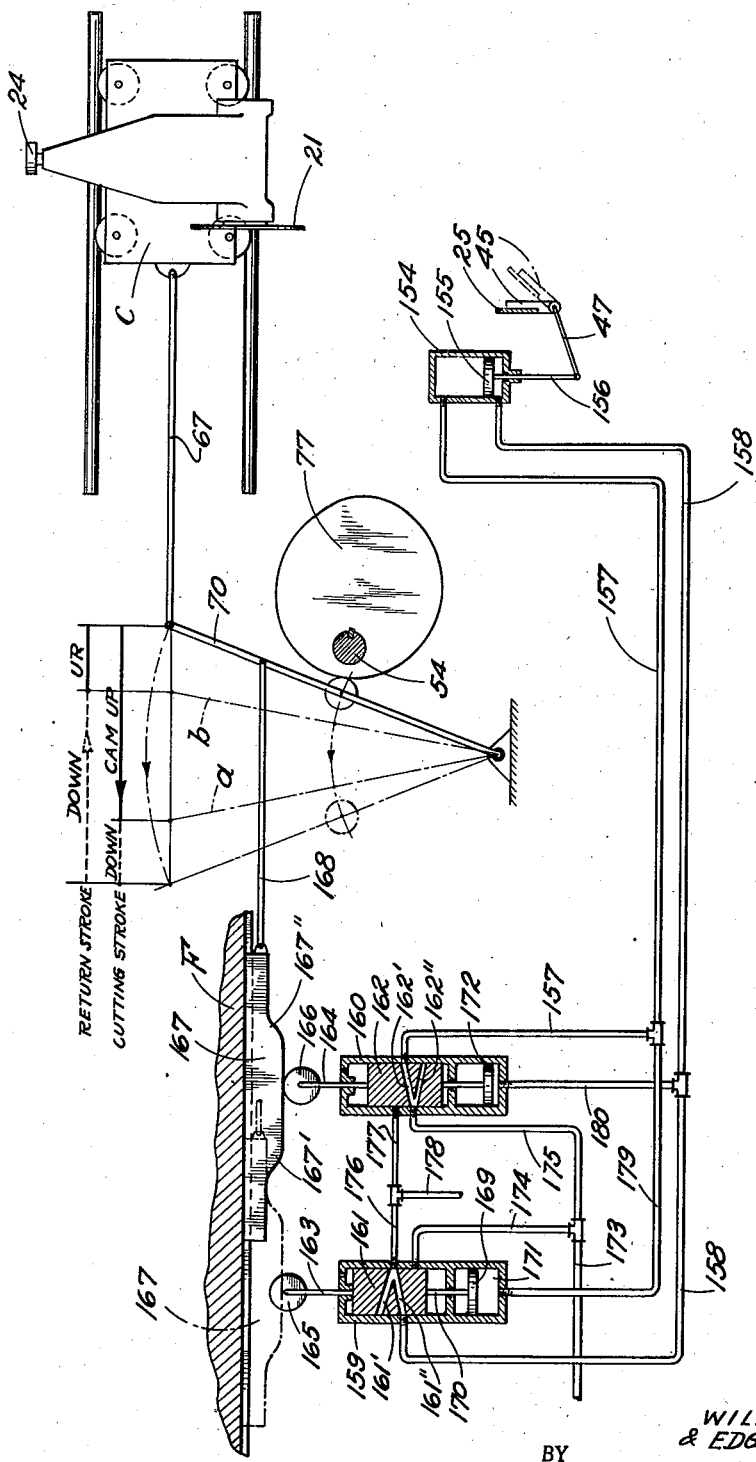

Patented June 6, 1944

2,350,975

UNITED STATES PATENT OFFICE 2,350,975

CUTOFF APPARATUS

William Rodder, Youngstown, and Edgar H. Kendall, Alliance, Ohio, assignors to The Aetna-Standard Engineering Company, Youngstown, Ohio, a corporation of Ohio Application March 28, 1941, Serial No. 385,739

12 Claims. (Cl. 29—69)

This invention relates to apparatus for cutting moving material and more particularly to an improved flying cut-off for continuous tube mills, or the like.

In modern continuous tube mill operation, an endless strip of steel is heated to welding temperature by passing through an elongated furnace. Upon emerging from the furnace, the moving strip is formed into tubular shape and the abutting edges welded, preferably by suitably arranged rolls. The speed of operation of these mills has been greatly increased in recent years and at present they may operate as high as 500 feet per minute producing pipe or tubing up to 4" or more in diameter. After such a furnace and welding mill is started in operation it is extremely desirable to keep it operating for as long a period as possible as stopping necessitates removing the strip from the furnace and the mill rolls and restarting of the plant is an expensive and time-consuming job due to the necessity of feeding the strip through the furnace and rolls and getting all of the successive operations coordinated to produce the proper weld at the high speeds employed.

Some type of flying cut-off mechanism is essential for these high-speed continuous tube mills and such a cut-off should be able to function continuously and without trouble for as long a period of time as the mill operates. In practice, this may be a matter of days or weeks without stop. Various types of cut-off mechanisms have been proposed and used and although some of these are satisfactory at relatively low tube speeds, numerous additional problems are encountered under the present high speed operating conditions. For example, when the tube is moving at 400 feet a minute, an error in timing the cut-off of approximately 1/100 of a second will result in an error of approximately three-fourths of an inch in the length of the tube cut. It is therefore among the objects of my invention to provide an improved flying cut-off mechanism for moving materials such as metal tubes, bars, sheets, or the like, which will accurately cut the moving material to length while such material is moving at high speeds and which will operate continuously for long periods of time.

Other objects of my invention include: the provision, in a flying saw, of driving means whereby the speed of operation of the saw is automatically adjusted to the mill speed; the provision of a flying cut-off device in which the cutting member travels at substantially the same rate as the material being cut for a period of time long enough to permit completion of the cut; the provision of a flying cut-off in which the cutting operation takes place in a single revolution of a drive shaft, said shaft having means for accurately locating it in exactly the same angular position after each cutting cycle; the provision of a flying saw in which the movement of the saw with the tube being severed is at the rate of tube travel and its return movement at a reduced rate; the provision of a flying saw in which the weight of the parts which are moved to sever a tube is reduced to a minimum whereby high-speed operation is facilitated; the provision of a flying cut-off which may be adjusted to cut different lengths and which will cut such lengths with a high degree of accuracy regardless of the speed of travel of the material being cut; the provision of a rugged and efficient flying saw which may readily be set to cut different diameters of tubing and which may be controlled either by a flag switch engaged by the tube end or timing mechanism on the tube mill.

The above and other objects of our invention will appear from the following description of one embodiment thereof, reference being had to the accompanying drawings in which:

Figure 1 is a somewhat diagrammatic plan view illustrating the last pass of a tube rolling mill, our improved flying cut-off mechanism, and the common driving means for the mill and cut-off;

Figure 2 is a side elevation of the apparatus shown in Figure 1;

Figure 3 is a vertical cross-sectional view through the cut-off drive shaft taken on line 3—3 of Figure 1;

Figure 4 is an enlarged plan view of the driving mechanism for the cut-off saw carriage;

Figure 5 is a fragmentary cross-sectional view taken on line 5—5 of Figure 4 and illustrating the clutch controlling solenoid and the operating linkage therefor;

Figure 6 is a fragmentary vertical cross-sectional view taken on line 6—6 of Figure 4;

Figure 7 is a vertical cross-sectional view taken on line 7—7 of Figure 4 and showing the single revolution clutch latch mechanism;

Figure 8 is a vertical cross-sectional view taken on line 8—8 of Figure 4 and showing the shock-absorbing and shaft-locating latch mechanism;

Figure 9 is a vertical cross-sectional view taken on line 9—9 of Figure 4 and illustrating the operating cam and control valve for the saw actuating cam;

Figure 10 is a fragmentary plan view of the saw carriage and its associated parts;

Figure 11 is a vertical cross-sectional view taken on line 11—11 of Figure 10;

Figure 12 is a detached view taken on line 12—12 of Figure 10 and showing the saw actuating cam and its support;

Figure 13 is a side elevation of the saw carriage taken on line 13—13 of Figure 10;

Figure 14 is a fragmentary enlarged view showing the main saw carriage actuating cam and return mechanism;

Figure 15 is a vertical cross-sectional view taken on line 15—15 of Figure 14;

Figure 16 is a diagrammatic layout of a modified mechanism for moving the saw actuating cam into and out of operating position.

Referring particularly to Figures 1 and 2, the general arrangement of our improved cut-off is shown. The last pass of a tube mill is indicated generally at A. This includes rolls 1 and 2, which are connected through suitable shafts and gearing to a gear box 3. Driving connections to the gear box 3 are established through shaft 4 from the main driving motor 5. It will be understood that the tube welding mill may consist of a plurality of roll stands, all of which are preferably driven by the motor 5. Variations in the speed of delivery of the welded tube from the rolls 1 and 2 may be effected by varying the speed of the motor 5.

A shaft 6 extends from the motor 5 at the opposite end from the shaft 4 and a variable speed drive unit 7 is interposed between the shaft 6 and the shaft 7', which is connected to the cut-off unit gear box 8. The gear box 8 drives the cut-off mechanism, as will be described in detail later. By driving the tube mill and the cut-off mechanism from the same motor 5, it will be seen that any variations in the tube speed due to change in the mill speed will immediately be reflected in the speed of operation of the cut-off mechanism and thus, if the cut-off mechanism is set to cut a predetermined length of tube it will do so, regardless of variations in the mill speed and tube travel.

Generally speaking, our cut-off mechanism comprises a saw supporting carriage C mounted for movement parallel to the path of travel of the tube, and a main drive shaft with control cams, clutches, etc., indicated generally at D, and adapted to move the saw carriage C at tube speed to permit severing of the tube without relative movement of the saw and tube. The saw carriage C and its supporting members will first be described and then the mechanism for moving the saw carriage will be explained.

Upwardly extending frame members 9 and 10 are mounted on the base of the apparatus and support the triangularly arranged rails or track bars 11, 12 and 13. These bars form track supports for the carriage C, which has suitably grooved wheels or rollers 14, 15 and 16, mounted for free rotation in engagement with the rails 11, 12 and 13 respectively. By this triangular arrangement, the carriage C may move freely in a direction parallel to the tube path, but is prevented from any lateral or vertical movement.

As best seen in Figures 10, 11 and 13, the frame 17 of the carriage C includes pivotal supports for the saw carrying arm 18. A saw driving motor 19 is mounted on the frame 17 with its shaft line on the center line about which the saw support 18 is pivoted. At the outer end 18' of arm 18 are suitable bearings for the saw shaft 20 which carries the disc saw 21. A multiple belt 22 and suitable pulleys provide driving connections between the saw shaft and the motor 19. With this arrangement, the saw 21 and arm 18 can be moved about the pivotal support without moving the motor 19. As the saw must swing downwardly to sever the tube and then be returned to its upper position in a very short time, the reduction in weight accomplished by the above described saw mounting is very helpful in achieving successful high speed cut-off operation.

The rear end 18" of the arm 18 carries a shaft 23 on which a roller 24 is freely rotatable. This roller is disposed to engage the saw actuating cam 25 during a portion of the movement of the carriage C on the rails 11, 12 and 13. The cam 25 is clearly seen in Figure 12 and as the carriage C moves in the direction of tube travel the roller 24 strikes the leading edge of cam 25 and then rolls up the inclined portion 26 until it reaches the point 27, where it drops off. When roller 24 first strikes cam 25, the arm 18 is in the position shown in full lines in Figure 11 and when the roller 24 reaches the top 27 of the incline 26, the arm 18 has been moved about its pivotal support to raise the end 18" and lower the end 18'. The saw 21 moves downwardly across the tube path during this operation and, if a tube is disposed in the supporting trough 28, the tube will be severed. To permit this movement of the saw 21, the support 28 is slotted at 29 and to enable the severed pipe to be removed, the trough 28 is preferably pivotally supported, as seen at 30, so that it can be tilted to discharge the severed pipe.

A pair of springs, 31 and 32, are mounted on pivoted rods, 33 and 34. These rods also carry a trough shaped member 35, through the bottom of which the rods 33 and 34 extend. Adjustable nuts 36 locate the trough 35 on the rods 33 and 34 and it will be seen from Figure 11 that bottom ends of rods 33 and 34 are pivotally secured to the frame 17 of the carriage C.

Springs 31 and 32 seat in the trough 35 and their upper ends are engaged by washers 37 retained on the rods 33 and 34 by adjustable nuts 38. Slotted holes 33' and 34' in the arm 18 permit the upper ends of rods 33 and 34 to extend freely therethrough. Thus, when the arm 18 is swung about its pivotal support by engagement of roller 24 with cam 25, the pins 37' secured to the washers 37 will be engaged by the flanges 37" on the arm 18 and the springs 31 and 32 will be compressed. These springs serve to return the arm 18 and saw 21 to their upper positions when the roller 24 drops off from the point 27 of the cam 25 and maintain the arm 18 and saw 21 with the saw out of the tube path at all times except when these parts are given tube cutting movement by the cam 25.

In order to prevent excessive bounce of the arm 18 and saw 21 on the upward movement which takes place when the roller 24 drops off of the point 27, rods 39 and 40 are secured to the opposite ends of the trough 35 and extend up through projecting lugs 41 and 42 respectively on the arm 18. The rods, 39 and 40, pass freely through holes in lugs 41 and 42 and are provided with stop nuts 43 at their upper ends. Thus, when the arm 18 is moved in counter-clockwise direction (Figure 11) by the springs 31 and 32, the lugs 41 and 42 will engage the nuts 43 and an upward pull will be exerted on the rods 39 and 40. This pull is absorbed by compression of the springs 31 and 32, which seat at their lower ends in the trough 35 to which the bottom ends of rods 39 and 40 are attached. By the above described spring mechanism, movement of the arm 18 and saw 21 in cutting direction is resisted sufficiently to give the proper action, the arm and saw are instantaneously returned to non-cutting position at the end of the cutting stroke, and any tendency of the arm 18 to travel too far under the upward throw of springs 31 and 32 is resisted by these same springs being acted upon through the rods 39 and 40.

An additional stabilizing device for the arm 18 is provided at the rear end 18" thereof. This comprises a shock absorber member 44, preferably of the hydraulic type and pivotally secured at its lower end to the frame 17 and at its upper end to the arm 18. This member may be either of the spring or pneumatic shock absorber type and serves to prevent the roller 24 from leaving the cam 25, thus making for further reduction of any tendency of the roller 24 to bounce when it strikes cam 25 during high speed operation of the apparatus.

After the carriage C has moved in the direction of tube travel (to the left in Figure 2) sufficiently to permit the saw to sever the tube, it must be returned to its original position. If the cam 26 were permitted to remain in its upright or operating position it would interfere with this return moving of the carriage C because the roller 24 would strike the cam. We therefore provide means for moving the cam 26 out of the way of the roller 24 during the return movement of the carriage.

As is clearly seen in Figure 12 cam 25 is detachably secured to a supporting plate 45 which has shaft portions 46 and 46' pivotally mounted in suitable bearings in the supporting frame structure for the track members 11, 12, and 13. For cutting tubes of different diameters different cams 25 may be employed. A lever 47 is secured on the end of the shaft 46 and pivotally connected at its outer end to the piston rod of a cylinder and piston assembly indicated at 48 in Figure 1. Movement of the piston in the cylinder 48 is in a vertical direction and it will be seen that when such movement is in an upward direction the shaft 46 will rotate in a direction to tilt the cam carrying plate 45 out of alignment with the path of the roller 24. As explained later, the upward movement of the piston in the cylinder 48 is caused by spring 64. A pipe 49 connects the top of cylinder 48 to a valve 50 mounted on a base 51 (see Figures 3 and 9). This valve 50 has an actuating member 52 engaged by a cam 53 mounted on and rotatable with the shaft 54. As the shaft 54 rotates, the cam 53 operates the valve 50 to cut off the supply of fluid under pressure intermittently to the cylinder 48 at a predetermined point near the end of the forward stroke of the carriage C. This release of pressure in cylinder 48 permits the spring 64 (Figure 11) to swing the plate 45 and cam 25 away from the carriage C, thus permitting return travel of the carriage and the saw actuating roller 24 without interference from the cam 25. After the roller 24 has passed the cam 25 on its return stroke, the cam 53 actuates the valves 50 to connect the fluid pressure to cylinder 48 to cause the plate 45 and cam 25 to be returned to their vertical positions, against the spring 64, and be ready for the next cutting stroke of the carriage. As will appear more fully later, the operation of the tilting cam support 45 is timed in relation to the movement of the carriage C so that the cam 25 is in operating position during the forward or cutting movement of the carriage and retracted out of the way during the return movement of the carriage. In Figure 11, the operating position of the cam 25 is shown in full lines, and the retracted position in dot and dash lines.

A combined retracting spring and shock absorber mechanism is provided to cushion movement of the cam 25 and its supporting plate 45. This comprises a pair of arms 55 and 55' (Figure 10) secured to the plate 45 and carrying a pivotally supported collar 56 at their outer ends. This collar 56 has a sliding fit on a rod 57 which is pivotally secured at its lower end on a shaft 58 mounted on the base of the machine. To cushion the retracting movement of plate 45, we provide a resilient bumper 59 of rubber, or the like, supported on a flange 60 secured to the rod 57. Upward movement of the arms 55 and 55' and plate 45 is limited by an adjustable flange 61 which is positioned on the rod 57 by nuts 62. A sliding collar 63 engages the flange 61 when the plate 45 is in its vertical position, as shown in Figure 11, and by adjusting the nuts 62, the vertical position of the plate 45 and cam 25 may be accurately adjusted. A spring 64 extends between the flange member 63 and an upper flange member 65 which is adjustably positioned on the rod 57 by nuts 66.

When the plate 45 is in vertical position with the cam 25 disposed in the path of the roller 24, the spring 64 is compressed and the fluid pressure in the cylinder 48, acting through its piston and the lever 47, holds the plate 45 in vertical position. Upon release of the fluid pressure in the cylinder 48 by action of the cam 53 and valve 50, the spring 64 immediately swings the plate 45 about its pivotal supports 46 and 46' until the sleeve 56 strikes the rubber bumper 59. This moves the cam 25 out of alignment with the path of the roller 24 and permits the carriage C to be returned to its starting position.

Advancing and returning movement is imparted to the carriage C through a connecting rod 67 which is pivotally connected at one end 68 to the carriage and, at the other end 69, to the operating lever 70. Support for the lever 70 is provided by a shaft 71 mounted in suitable bearing blocks 72 and 73 mounted on the base of the machine. Referring particularly to Figure 14, the starting or retracting position of the lever 70 is seen in full lines and its forward or advanced position indicated by dot and dash lines, and it will be understood that movement of the lever 70 from its starting position to its advanced position and back again to its starting position will advance and return to carriage C.

The lever 70 is preferably of bifurcated form as seen in Figure 15, and a bracket 74 is secured to the lever between its top and bottom ends. The follower roll 75 is supported between the two side portions of the lever 70 on a shaft 76, and engages the main operating cam 77 which is mounted and rotates with the main drive shaft 54. As will be explained more fully later, the cam 77 is so contoured that the desired movement will be imparted to the operating lever 70 and the carriage C. Cam 77 rotates in counter-clockwise direction as seen in Figure 14.

One end of a piston rod 78 is pivotally secured to the bracket 74 through the yoke 79, and the other end of piston rod 78 carries a piston 80 disposed in a cylinder 81. Fluid under pressure, such as compressed air from a suitable source, is supplied to the lower end of the cylinder 81 through the reduced extension 81' of cylinder 81.

The inlet port for this fluid is seen at 82 in Figure 14, and a pipe 83 leads to a tank 84 which is connected to a supply pipe 85 through a pressure regulating valve 86. A reduced extension 80′ of the piston 80 is adapted to enter and closely fit the bore 81″ of the reduced extension 81′ of the cylinder 81 to shut off opening 82 from the main portion of the cylinder 81 and provide a cushioning action when the piston 80 approaches the end of its forward stroke. The escape of air from the lower end of cylinder 81 after the plunger 80′ enters bore 81″ may be regulated by an adjustable needle valve 87.

A similar cushioning arrangement may be provided at the upper end of the main cylinder 81 but is not illustrated as it may in some cases be omitted. The flow of air to and from the cylinder 81 on the upper or piston rod side of the piston 80 is controlled by a combined check and needle valve 88. This valve permits air from the atmosphere freely to enter the cylinder 81 during the downward carriage advancing stroke of the piston 80. During the upward or return stroke of the piston 80, however, the valve 88 restricts the flow of air from the cylinder 81 in accordance with an adjustable needle valve. By this means the rate of travel of the return stroke of piston 80, lever 70, and carriage C, may be controlled.

As is seen in Figure 14, the cylinder 80 is mounted on trunnions 89 supported on a bracket 90. To permit tilting movement of the cylinder 81, a flexible hose, or the like, 83′ is provided in the air connections from the tank 84 to the cylinder.

The operation of the above described carriage return cylinder is as follows:

When the lever 70 is in the position shown in Figure 14 carriage C is in its retracted or starting position. Rotation of the cam 77 in counter-clockwise direction will cause lever 70 to be swung into the position indicated in dot and dash lines in Figure 14. Air under pressure, for example about thirty pounds per square inch, is applied to the tank 84 and to the cylinder 81, and during the advancing movement of the lever 70 and carriage C air will be forced from the cylinder 81 back through port 82 and pipe 83 into the tank 84 against the pressure supplied through the valve 86. Before the lever 70 reaches the end of its advancing stroke the extension 80′ of the piston 80 passes into the bore 81″ of the throat member 91. When this occurs the outlet through port 82 is closed and a cushioning action occurs as the only escape for air from the cylinder 81 is now through the adjustable needle valve 87. This valve may be set to provide the desired rate of cushioning of the final portion of the movement of the piston 80 in the cylinder 81′.

As the cam 77 continues to rotate, after lever 70 has reached its full advanced position, the air pressure acting upon the piston 80 and its extension 81′ will move the lever 70 back to its original position. By properly setting the valve 88 which controls the escape of air from the upper part of cylinder 81, the speed of the return stroke can be controlled, and cushion mechanism at the upper end of cylinder 81, previously referred to, may be employed to cushion the final part of the return stroke so that shock and damage to the mechanism is avoided. Thus it will be seen that cylinder 81 and its associated parts comprise in effect an air spring which is compressed during the advancing movement of the carriage and which returns the carriage to its original position after a cutting stroke. Cushion means are provided at the end of the stroke to prevent undesirable shock or impact, and in the high speed operation of our apparatus, this pneumatic cushioning return mechanism has proved very successful.

The shaft 54, which drives the main cam 77, is supported in bearings 92 and 93 mounted on suitable bases 94 and 95. The left hand end of shaft 54 (Figure 3) extends into the single revolution clutch, which is generally indicated at 96, and the shaft terminates at 97. The details of the single revolution clutch 96 form no part of the present invention, and it will suffice to point out that the shaft 54 is keyed at 98 to the driven portion 99 of the clutch. The driving portion of clutch 96 is supported on bearings 101 and 102 for free rotation, and is connected by a key 103 to the driven portion 104 of a flexible coupling generally indicated at 105. The drive side 106 of coupling 105 is keyed to the shaft 107 from the gear box 8.

When the mill is operating and producing tubing, the drive motor 5 continuously rotates the driven portion 100 of the single revolution clutch 96 as an unbroken series of gears and shafts extended from motor 5 to driven element 100. Our cut-off mechanism is so arranged that a single revolution of the shaft 54 will effect a complete cycle of carriage movement and saw operation and return of the parts to their original positions. Thus, it is necessary to provide means for starting the single revolution clutch in operation and for accurately stopping this clutch so that for each repeated cutting off operation, the shaft 54 will start its rotation from exactly the same angular position. The necessity for extreme accuracy in the operation of the single revolution clutch 96 and the shaft 54 will be appreciated when it is realized that at the ordinary operating speed of the type of mill with which my saw is used, an error of approximately $\frac{1}{100}$ of a second in timing the cutting action of the saw, will result in an error of $\frac{3}{4}$ of an inch in the length of the pipe severed.

Operation of the clutch 96 is controlled by a latch disc 108 (see Figure 7) having a projecting lug portion 109 normally engaged by the spring supported head 110 of the pivoted arm 111. Arm 111 is mounted on a shaft 112 supported in the stationary frame of the machine and a link 113 carries at one end a pin 114 which engages a slot 115 in the arm 111. The other end of link 113 is pivotally secured to a lever 116 secured to shaft 117.

A bell crank extension 118 is formed on arm 111, and a rod 119 extends upwardly from bell crank 118 through a fixed bracket 120. The spring 121 abuts at its upper end against a washer 122 adjustably secured on the rod 119 by nuts 123. This spring 121 is normally under compression and exerts a lifting force on rod 119 tending to swing the arm 111 in clockwise direction (Figure 7) and to maintain the head 110 in engagement with the face of the latching disc 108. A certain amount of lost motion is provided between the lever 116 and the arm 111 by the pin and slot connection 114—115, and the purpose of this lost motion will be explained later.

As is seen in Figure 4, shaft 117 extends parallel to shaft 54 and is supported on suitable bearings mounted on the main frame or base structure. One end of shaft 117 carries a lever 124 which is connected by link 125 to the operating arm 126 of a solenoid 127. This solenoid is suitably supported on the frame of the machine and is connected to a flag switch, or other mechanism (not shown) which is adapted to be engaged by the advancing end of the tube to be severed. The electric connections from the flag switch to the solenoid 127 form no part of this invention and are not illustrated but it will be understood that they are such that when the advancing tube end engages the flag switch the solenoid 127 will be momentarily energized to move the lever arm 124 in counter-clockwise direction (Figure 5). This will impart similar movement to the shaft 117 and lever 116, and will withdraw the stop member 110 from engagement with the lug 109 of the latch 108. Spring means are incoporated in solenoid 127 for returning shaft 117 and its associated parts to their original positions after the above described counter-clockwise movement.

When the stop 110 is withdrawn the single revolution clutch 96 will drive the shaft 54 for one revolution. Only a single revolution can be made because the spring 121 tends to hold the spring stop 110 in contact with the surface of the latch disc 108 so that after a single revolution has been completed, the lug 109 will again engage the stop 110.

In order to protect the mechanism of the single revolution clutch 96 against the repeated severe impact which would occur when the rotation of the shaft 54 and its associated parts is suddenly stopped, we provide a secondary shock absorbing stop and positive locating mechanism which is best seen in Figure 8. This includes a disc 128 keyed to the shaft 54 on the opposite side of the bearing 93 from the clutch 96. This disc 128 is provided with a pair of opposite lug portions 129 and 130 which are engaged by the upper ends of vertically extending arms 131 and 132. A pivoted frame member 133 is mounted on a shaft 134 carried by the fixed main frame structure W, and arm 132 is also pivoted on this same shaft. Arm 131 is rotatably mounted at its lower end on a shaft 135 carried by the frame 133, and a link 136 connects arm 131 to a lever 137 which in turn is keyed to and rotatable with shaft 117. A rod 138 is pivoted to the frame 133 at its upper end and extends into a tubular well 139, in which is disposed a heavy spring 140. The tubular well 139 is carried by the main frame as seen at 141.

Arm 132 is always urged toward locking position relative to lug 130 by means of a rod 142 connected to a bell crank arm 143 on the arm 132. Rod 142 extends through a fixed bracket 144 and a compression spring 145 pushes against the adjustable flange 146 tending to swing the arm 132 counter-clockwise (Figure 8), and maintain the upper end thereof in contact with the face of the disc member 128.

In order to locate the position of the pivoted frame 133 relative to its supporting shaft 134 and thus to locate accurately the positions of the locking arms 131 and 132, we provide a pin 147 which is carried by the end of frame 133. A rod 148 has a sliding fit through a hole in the pin 147 and carries a flange 149 at its lower end. Compression spring 150 engages the flange 149 at one end and the fixed frame F of the machine at its upper end and thus exerts a downward force on the rod 148. A spacer sleeve 151 adjustable by nuts 152 engages the top of the pin 147 and exerts a downward force thereon which normally seats the pin 147 in a locating cradle member 153 supported on the main frame F.

The operation of our single revolution clutch and control mechanism therefor will now be described. As explained previously the flexible coupling 105 is driven continuously as long as the apparatus is operating and the mill is producing tubing. When the stop 110 engages the lug 109, the shaft 54 cannot rotate. At the same time the arms 131 and 132 are engaging the lugs 129 and 130 on the disc 128. This also serves to prevent rotation of shaft 54 in either direction and accurately locates the angular position of the shaft 54 and of the main driving cam 77. When the advancing end of the tube being produced by the mill strikes the flag switch previously referred to, the solenoid 127 is energized and the shaft 117 rotated in counter-clockwise direction. The immediate result of this rotation of shaft 117 is the withdrawal of the arm 131 from engagement with the lug 129. This is immediately followed by withdrawal of the stop 110 from engagement with the lug 109 of the one revolution clutch disc 108. The slot 115 in the arm 111 permits the arm 131 to first be disengaged from lug 129 before stop 110 is withdrawn from lug 109, and thus any possibility of placing the one revolution clutch in condition for driving prior to releasing the lug 129 is prevented.

Both of the stop arms 111 and 131, having now been withdrawn, the single revolution clutch 96 immediately picks up and rotates the shaft 54 through a single revolution. As the arms 131 and 111 are urged at all times into their lug engaging positions, as soon as their respective lugs come around they will be engaged, and rotation of the shaft 54 will instantaneously stop. Arm 131 is urged into lug engaging position by a spring (not shown) which forms a part of the solenoid 127, and which tends at all times to rotate the shaft 117 in clockwise direction (Figure 8).

The actual stopping of shaft 54 is effected by engagement of lug 129 with arm 131, and this shock is transmitted through the pivoted frame 133 to the heavy spring 140. Although downward movement of the left hand end of frame 133, as seen in Figure 8, will cause upward movement of the right hand end thereof, this is permitted through the spring 150 and rod 148. After the shock is absorbed however, spring 150 will return the end of frame 133 to its seated position in the member 153, and the arms 131 and 132, through their engagement with the lugs 129 and 130, will set the shaft 54 in exactly the same angular position as it had prior to its last rotation. The arm 132 is moved out of the way by the lug 129 during rotation of shaft 54. This movement is permitted by the spring 145 which also holds the arm 132 against the surface of disc 128 so that it will be in position to engage the lug 130 if there is any tendency for backward rotation of shaft 54.

By the above described mechanism, the impact shock of stopping the shaft 54 and its associated parts is removed from the arm 111 which controls the operation of the single revolution clutch. As clutch 96 is of a type which operates uniformly and has exactly the same engaging time each time it operates, engagement of the flag switch by the end of the tube will result in severing uniform lengths of tube within extremely narrow limits.

By moving the carriage C through rotation of the cam 77 we are able to move the carriage and the saw 21 at exactly tube speed for a long enough time to permit the saw to move downwardly during its cutting stroke and return to its original position. This travel of the saw carriage at exactly tube speed is very important in high speed apparatus of the type referred to herein. Previously proposed flying saws which have been operated by crank and connecting rod mechanisms, have not achieved the results obtained by us, because, with such arrangements, the carriage is moving at a different speed at every point of its travel and will only be travelling at exactly tube speed for an instantaneous period of time. Although such devices may operate fairly well in relatively slow speed work, they are not entirely satisfactory for modern high speed tube mills. The cam 72 is so contoured that when the single revolution clutch 96 takes hold, the arm 70 and carriage C are first accelerated to tube speed within a very short time. Then, a predetermined uniform rate of travel of the arm 70 and carriage C is maintained during which time the saw completes its severing stroke and is returned to starting position. After this relatively long uniform speed movement, the cam permits the carriage to be brought to a quick stop by the cushioning cylinder 81. Furthermore, the cam is so contoured that it does not interfere with the return stroke of the arm 70 and carriage C which may be effected at a relatively slow speed. The variable speed drive unit 7 is adjusted so that the rate of travel of the carriage C during the uniform speed portion of its advancing movement is exactly the same as the rate of travel of the tube. Thus there is no relative movement between the carriage and the tube during the cutting movement of the saw.

After the variable speed drive 7 has been adjusted to correlate the speed of the tube and the speed of the saw carriage any variations in the mill speed or tube travel will be automatically compensated for because the motor 5 drives both the tube mill and the cut-off mechanism, and any increase or decrease in the mill speed will immediately be reflected in a corresponding increase or decrease in the speed of rotation of the shaft 54. Thus, the saw carriage C will always travel at exactly the same speed as the tube during the foreward movement of the carriage, and accurate cutting of the tube lengths is assured.

In Figure 16, we have diagrammatically illustrated a modified arrangement for controlling and operating the support mechanism of the saw actuating cam 25. It will be understood that this figure is illustrative only, and is not to scale. Similar parts, however, will be referred to by reference characters similar to those used on the other figures of the drawings.

The shaft 54 carries the cam 77 which, as previously described, is properly contoured to give the desired movement to the arm 70. The connecting rod 67 joins the arm 70 and the carriage C. To operate the cam carrying bar 45 and cam 25, a cylinder 154 is provided having a piston 155 therein. Piston rod 156 is connected to the operating lever 47. Pipes 157 and 158 lead to the top and bottom respectively of the cylinder 154 from the control valves which are generally indicated at 159 and 160. Each control valve 159 and 160 includes a sliding plunger member, 161 and 162, having operating rods 163 and 164 extending upwardly through the valve housings. Rollers 165 and 166 are carried by rods 163 and 164, and are adapted to be engaged by a horizontally moving cam member 167. This cam is suitably supported for sliding movement on the frame F of the machine, and is connected to the lever 70 by a connecting rod or link 168.

Valve 159 has a piston member 169 connected by a rod 170 to the plunger 161 and operable in a closed cylinder portion 171 of the valve housing. Valve 160 has a similarly arranged piston 172. Operating fluid such as compressed air is supplied through the line 173 which has branches 174 and 175 leading to the valves 159 and 160 respectively. Exhaust pipes 176 and 177 extend from the valves 159 and 160 to a common exhaust conduit 178. Pipe 157 from the top of the cylinder 154 leads to valve 160, and has an extension 179 leading to the cylinder 171 of valve 159. In like manner pipe 158 from the bottom of cylinder 154 leads to the valve 159 and has an extension 180 leading to the cylinder of valve 160 in which piston 172 is disposed.

In order to operate the valves 159 and 160 in the proper timed relation, the inclined portions 167' and 167" of the cam 167 are so spaced that at the beginning of the advance stroke of the lever 70, the cam 167 will engage the roller 166 to hold valve 160 in the position shown. In this position, line pressure from the pipes 173 and 175 passes through the opening 162' in the valve plunger 162 into the pipe 157 and to the top of cylinder 154. At the same time the pipe 158 is connected through the opening 161" to the exhaust pipe 176, and thus, the bottom of the cylinder 154 is connected to the atmosphere. Under these conditions, the fluid pressure will hold the piston 155 in its bottom position which will maintain the bar 45 and cam 55 in their upright or operating positions. While these connections maintain, it will be seen that the bottom of cylinder 171 is also connected to the pressure supply through the pipes 179 and 157, and the pressure on the piston 169 will hold the valve 161 in its upper position, as shown in the drawings.

When the lever 70 has moved in advancing direction to the point indicated by the dot and dash line a, the saw stroke will have been completed, and the cam slope 167' will engage and depress the roller 165 to shift the valve 159. When this occurs, pressure will be connected through the pipes 173 and 174 and the opening 161' in plunger 161 to the pipe 158 which leads to the bottom of cylinder 154. At the same time pressure will be applied through the branch pipe 180 to the bottom of the piston 172, and will lift the valve plunger 162 to shift the connections thereof so that the pipe 157 is connected to exhaust through the pipe 177.

Thus, when the cam portion 167' strikes the roller 165, the valves 159 and 160 are shifted to reverse the fluid connections to the cylinder 154, and cause the piston 155 to move to the top of the cylinder. This movement tilts the cam bar 45 and the cam 25 into the retracted position indicated in dot and dash lines in Figure 16. This retracted position is maintained during the remainder of the advancing stroke and during a part of the retracting stroke until the lever 70 reaches the point indicated by the dot and dash line b in Figure 16. When this point is reached the incline 167" of the cam 167 strikes the roller 166 which is now in its elevated position, and moves it downwardly causing the reverse of the above described valve shifting operation and returning the cam 25 to its upright operating position.

In Figure 16 we have projected the cutting stroke and the return stroke of the top of lever 70, and have indicated the portion of the stroke in which the cam is up or in operating position by full lines and the portions of the stroke during which the cam is retracted or withdrawn by dotted lines.

This modified control for the cam 25 eliminates spring mechanisms and assures that the cam 25 will always be in the proper position.

Although we have described and illustrated embodiments of our invention in considerable detail, it will be understood by those skilled in the art that numerous variations and modifications may be made in our apparatus without departing from the spirit of our invention. We do not, therefore, wish to be limited to the particular arrangement herein shown and described but claim as our invention all embodiments thereof coming within the scope of the appended claims.

We claim:

1. In a flying cut-off of the type described, a carriage, means for supporting said carriage for advancing and retracting movement, means carried by said carriage for severing a moving article, means for moving said carriage in advancing direction including a cam adapted to move said carriage at a substantially constant rate of travel during a portion of its advancing movement and means for driving said cam, means for causing said severing means to operate to sever the moving article during said constant speed portion of said advancing stroke, and means for retracting said carriage, the speed of said retracting means being controllable independently of the speed of the driving means for said cam.

2. In apparatus of the type described, a carriage, means for supporting said carriage for advancing and retracting movement, a shaft, a cam carried by said shaft for advancing said carriage, a lever pivotally supported and positioned to be moved in one direction by said cam, a connecting member extending from said lever to said carriage, means for imparting a single revolution to said shaft and cam, independent means for stopping said shaft after each single revolution, said independent means including a disc having a lug extending therefrom, a pivotally supported frame member, means carried by said frame member and adapted to engage said disc and lug, a spring support for said frame member, resilient means for locating said frame member in a predetermined position after each single revolution of said shaft, and means for retracting said carriage operable at a speed independent of the speed of said shaft.

3. In a flying cut-off mechanism, the combination of carriage, severing means carried by said carriage, cam means for moving said carriage in advancing direction from a starting position, said cam means being contoured to first rapidly accelerate said carriage, then move said carriage for a predetermined length of travel at a substantially constant rate of speed, and then permit said carriage to be rapidly decelerated, and means including a cylinder and piston therein for decelerating said carriage, said decelerating means being also adapted to return said carriage to its starting position.

4. In apparatus of the type described, a carriage, supporting means for said carriage, cam means for moving said carriage in advancing direction from a starting position, fluid pressure actuated means for resisting advancing movement of said carriage and returning said carriage to said starting position, a saw mounted on said carriage for tube severing movement transversely of the direction of movement of said carriage, said cam means being adapted to move said carriage at a substantially uniform rate of travel for a portion of its movement in advancing direction, and means for moving said saw transversely of said carriage movement during said uniform travel of said carriage in advancing direction.

5. In apparatus of the type described, a carriage supporting means for said carriage, cam means for moving said carriage in advancing direction from a starting position, fluid pressure actuated means for returning said carriage to said starting position, a saw mounted on said carriage for tube severing movement transversely of the direction of movement of said carriage, said cam means being adapted to move said carriage at a substantially uniform rate of travel for a portion of its movement in advancing direction, and means for moving said saw transversely of said carriage movement during said uniform travel of said carriage in advancing direction, said saw moving means comprising a cam mounted on said carriage supporting means, a follower on said carriage positioned to engage said cam as said carriage moves in advancing direction, operating connections between said follower and saw whereby relative movement between said follower and said cam causes said saw to move in severing direction and then retract, and means for retracting said cam out of the way of said follower during the return movement of said carriage.

6. In a flying saw of the type described, a carriage, track means for supporting said carriage for advancing movement from a starting position and return movement to said starting position, an arm pivotally mounted on said carriage, a saw rotatably supported at one end of said arm, a motor carried by said carriage and having its shaft aligned with the pivotal support of said arm, driving means between said motor and said saw, a cam supported for tilting movement adjacent said track means, cam engaging means on the opposite end of said arm from said saw, said cam being adapted to move said cam engaging means to tilt said arm and move said saw in severing direction as said carriage moves in advancing direction, means for advancing and returning said carriage, and fluid pressure actuated means for retracting said cam out of the way of said cam engaging means during at least a portion of the return movement of said carriage.

7. In combination in apparatus of the type described, a carriage, a saw on said carriage, means for imparting advancing and retracting movement to said carriage, cam means for moving said saw on said carriage in a direction transverse to the advancing and retracting movement of said carriage, fluid pressure actuated means for positioning said cam means out of operating position during at least a portion of said retracting movement of said carriage and for returning said cam means to operating position, control valve means for said fluid pressure actuated means, and means operated by said carriage moving means for actuating said control valve means.

8. In flying cut-off apparatus having a movable saw carrying carriage, a movably supported cam for actuating the saw as said carriage advances, and means for moving said cam out of operating position whereby the carriage may be retracted, said cam moving means including a cylinder, a pressure responsive element in said cylinder, operating connections from said element to said cam, and means, operated by movement of said carriage, for controlling the flow of fluid under pressure to and from said cylinder.

9. In apparatus of the type described, a continuously driven shaft, a main carriage operating shaft, a single revolution clutch connecting said shafts, means for controlling the operation of said single revolution clutch, independent means including a spring for stopping and absorbing the shock of stopping said shaft and preventing rotation of the shaft in either direction, a carriage, means actuated by a single revolution of said main operating shaft for advancing and retracting said carriage, solenoid means for operating said clutch control means and said shaft stopping means, and means, actuated by movement of the material being handled, for controlling said solenoid means.

10. In apparatus of the type described, a continuously driven shaft, a main operating shaft, a single revolution clutch connecting said shafts, means for controlling the operation of said single revolution clutch, means for stopping said main shaft after a single revolution thereof, said stopping means including a spring for absorbing the shock of stopping said shaft and latch means for presenting rotation of the shaft in either direction, a carriage, means actuated by a single revolution of said main operating shaft for advancing and retracting said carriage, means for operating said clutch control means and said shaft stopping means including a solenoid, and operating connections from said solenoid to said clutch control means and to said shaft stopping means, said connections to said clutch control means having lost motion therein whereby said shaft stopping means will always be released from shaft stopping position before said clutch control means are moved to engage said clutch.

11. In flying cut-off apparatus having a carriage and a main driving shaft for operating said carriage, means for stopping and locating said shaft after a single rotation thereof comprising a disc secured to said shaft and having spaced lugs extending from its periphery, a frame pivotally supported adjacent said disc, an arm pivoted on said frame and normally engaging one of said lugs to prevent rotation of said shaft in driving direction, a second arm pivoted at the pivotal support for said frame and normally engaging the other of said lugs to prevent rotation of said shaft in opposite to driving direction, spring means tending to urge said second arm into engagement with said disc, and a resilient support for said frame positioned to oppose and cushion movement of said frame caused by impact of said one of said lugs against said arm pivoted on said frame.

12. In a flying cut-off of the type described, a carriage, track means for supporting said carriage for advancing movement from a starting position and return movement to said starting position, an arm pivotally mounted on said carriage, a cutting device supported at one end of said arm, a cam supported for tilting movement adjacent said track means, cam engaging means on the opposite end of said arm from said cutting device, said cam being adapted to move said cam engaging means to tilt said arm and move said cutting device in severing direction as said carriage moves in advancing direction, means for advancing and returning said carriage, and fluid pressure actuated means for retracting said cam out of the way of said cam engaging means during at least a portion of the return movement of said carriage.

WILLIAM RODDER.
EDGAR H. KENDALL.